(12) United States Patent
Egeler et al.

(10) Patent No.: US 9,890,295 B2
(45) Date of Patent: Feb. 13, 2018

(54) SILICIC ESTER MODIFIED PHENOL/FORMALDEHYDE NOVOLAKS AND THEIR USE FOR THE PRODUCTION OF RESIN COATED SUBSTRATES

(75) Inventors: Nicolas Egeler, Krefeld (DE); Marek Torbus, Krefeld (DE); Milan Knezevic, Niskayuna, NY (US); Gee Ho Bae, Ansan-Si (KR); Robert Laitar, Woodridge, IL (US); Douglas Trinowski, Rochester Hills, MI (US); Wolfgang Seelbach, Korschenbroich (DE)

(73) Assignee: HUTTENES-ALBERTUS CHEMISCHE WERKE GMBH, Dusseldorf (DE)

( * ) Notice: Subject to any disclaimer, the term of this patent is extended or adjusted under 35 U.S.C. 154(b) by 580 days.

(21) Appl. No.: 14/116,293

(22) PCT Filed: Apr. 20, 2012

(86) PCT No.: PCT/EP2012/057236
§ 371 (c)(1),
(2), (4) Date: Nov. 12, 2013

(87) PCT Pub. No.: WO2012/152563
PCT Pub. Date: Nov. 15, 2012

(65) Prior Publication Data
US 2014/0090306 A1   Apr. 3, 2014

(30) Foreign Application Priority Data
May 10, 2011   (EP) ..................... 11165587

(51) Int. Cl.
| C09D 161/14 | (2006.01) |
| B22C 1/22 | (2006.01) |
| C08G 8/26 | (2006.01) |
| C08L 61/14 | (2006.01) |
| C08K 5/5415 | (2006.01) |

(52) U.S. Cl.
CPC .......... *C09D 161/14* (2013.01); *B22C 1/2246* (2013.01); *B22C 1/2253* (2013.01); *C08G 8/26* (2013.01); *C08L 61/14* (2013.01); *C08K 5/5415* (2013.01); *Y02P 20/582* (2015.11)

(58) Field of Classification Search
CPC ....... B22C 1/2246; B22C 1/2253; C08G 8/26; C08L 61/14; C09D 161/14
See application file for complete search history.

(56) References Cited

U.S. PATENT DOCUMENTS

| 2,182,208 A | 12/1939 | Nason |
| 2,657,974 A | 11/1953 | Cook et al. |
| 3,409,579 A * | 11/1968 | Robins ................. B22C 1/2253 164/16 |
| 6,465,542 B1 | 10/2002 | Torbus et al. |
| 2003/0168133 A1 | 9/2003 | Kaneko et al. |
| 2011/0269902 A1 | 3/2011 | Huettenes |
| 2014/0090306 A1 * | 4/2014 | Egeler ................. B22C 1/2246 51/298 |

FOREIGN PATENT DOCUMENTS

| JP | 2004255451 | 9/2004 |
| KR | 1020060013417 | 3/2011 |
| KR | 1020110105833 | 9/2011 |

OTHER PUBLICATIONS

Hesse, Wolfgang. Phenolic Reins. Ullmann's Encyclopedia of Industrial Chemistry. Published online Jun. 15, 2000. Obtained from http://onlinelibrary.wiley.com/doi/10.1002/14356007.a19_371/full on Mar. 15, 2017.*

\* cited by examiner

*Primary Examiner* — Michael A Salvitti
(74) *Attorney, Agent, or Firm* — Duane Morris LLP; Gregory M. Lekfowitz; Jason M. Nolan

(57) ABSTRACT

This invention relates to a resin preparable by reaction of a phenol/formaldehyde novolak with tetraethyl orthosilicate in a mass ratio above 28:1, wherein the phenol of the phenol/formaldehyde novolak is substituted or unsubstituted hydroxybenzene or a mixture of two or more such phenols, and to a particulate material coated with said resin. Said particles can be used e.g. in the shell molding process for the production of shell molds and shell cores; and as proppants for use in the hydraulic fracturing process.

26 Claims, No Drawings

SILICIC ESTER MODIFIED PHENOL/FORMALDEHYDE NOVOLAKS AND THEIR USE FOR THE PRODUCTION OF RESIN COATED SUBSTRATES

CROSS-REFERENCE TO RELATED APPLICATIONS

This application is a § 371 national stage entry of International Application No. PCT/EP2012/057236, filed Apr. 20, 2012, which claims priority to European Patent Application No. 11165587.4 filed May 10, 2011, the entire contents of which are incorporated herein by reference.

This invention relates to a resin preparable by reaction of a phenol/formaldehyde novolak with tetraethyl orthosilicate, the use thereof as a coating and/or binder for particulate material, a particulate material coated with such resin, methods of making such resin and a particulate material coated with such resins and processes for coating and/or binding a particulate material. Preferred uses of the resin and the coated particulate material are indicated below.

Since the Croning or "shell" process (German term: Maskenformverfahren, hereinbelow also referred to as shell molding process) for making cores and molds was developed in Germany by Johannes Croning in the late 1930's, it has become one of the most widely used foundry sand binding processes. Even today, there are castings which can be made only by means of the shell process.

The sand or other particulate material used for the shell process must be pre-coated with resin wherein the coating also comprises a curing agent. However, many foundries do not have the equipment needed to coat the sand. Thus, they purchase the coated sand from an external supplier.

Sand (or other particulate material) may be coated according to the warm coating process or the hot coating process:

The warm coating process typically uses a phenolic novolak resin dissolved in a solvent (resin solution) and a curing agent that is either pre-blended with the resin/solvent blend or dispersed in water. The preheated sand is charged into a mixer. The resin/solvent blend is added either alone followed by the curing agent and additives or as a pre-blend with the resin and the solvent. The solvent is removed from the sand mix by the heat of friction and by blowing warm air through the sand mixer or by applying a slight vacuum. After discharge and screening, a dry, resin coated sand remains with the curing agent already in it.

The hot coating process uses a solid phenolic novolak resin which is applied in the form of flakes or pastilles, and a dry curing agent which may be dispersed in water. The sand is pre-heated to 130-160° C. before it is charged into the mixer. The flaked resin is added and then melted onto the sand. The curing agent is added with the water. The sand is cooled by blowing air through the sand mixer. After discharge, screening and further cooling, a dry resin coated sand remains with the curing agent already in it, without emitting any solvents into the atmosphere.

In both processes, the phenolic resin is used in an amount in the range of from 1.0 to 5.0% by weight of the sand. The most commonly used curing agent (crosslinking agent) hexamethylenetetramine (hereinbelow also referred to as "Hexa") is used in an amount in the range of 5.0 to 18.0% by weight of the resin. Some or all of the hexamethylenetetramine can be replaced by reactive resols that can also crosslink and cure the novolak resin.

Various additives are used during the coating operation for specific purposes. Iron oxide, for example, can be added in order to prevent thermal cracking and to provide chill and to minimize gas-related defects. Other additives like calcium stearate or zinc stearate or natural or synthetic waxes are often added as release agents and lubricants to improve the flowability of the sand mix.

The shell process has considerable advantages over other processes. The better blowability and superior flowability of the shell sand (in particular if containing lubricants) permits intricate cores to be blown. The manufacturing of hollow cores is also possible. The shell molding process offers excellent surface reproduction. Because the bench life of the coated shell sand is indefinite, machines do not require the removal of sand at the end of a production period. The storage life of the cured molds or cores is excellent. These advantages render the shell process preferable over other hot curing processes like the warm- or the hot-box process. Shell cores have similar or rather higher handling strength than e.g. hot-box cores.

In spite of the numerous advantages brought about by the shell process, many foundries are being forced to replace it due to operating restrictions enforced by regulatory agencies and concerned neighbors. The shell process uses a phenol/formaldehyde novolak resin cured by heat in the presence of hexamethylenetetramine. Decomposition of the hexamethylenetetramine during curing of the shell sand may produce formaldehyde and ammonia. Most of the formaldehyde is consumed during curing of the shell sand whereas some ammonia evaporates and its odor is difficult or impossible to control. Additionally, smoke is formed during core and mold making.

Disadvantages of the above-described shell process or Croning process are the above mentioned emissions but also the fact that compared to other binder systems a higher level of binder is necessary to generate sufficient strength of a core or mold. The higher content of organic binders in the resin coated sand leads to increased gas emissions during and after casting and can cause gas defects in the casting. Additionally the cost of organic binders is high compared to the uncoated sand or substrate. It is therefore desirable to provide resin coated sand substrates comprising an amount of binder and curing agent as low as possible. Another advantageous effect of such systems with a low content of binder is that they exhibit less obnoxious odors during and after casting due to less organic matter being present.

The prior art discloses (i) resins for foundry applications and (ii) mixtures comprising a resin and a foundry sand.

U.S. Pat. No. 2,182,208 A1 discloses a synthetic resin which is the reaction product of constituents consisting essentially of the following reactants: para-tertiary-butylphenol, formaldehyde, and tetraethyl orthosilicate. According to examples 1 and 5, a resin is obtained by reacting formaldehyde and para-tertiary-butyl-phenol, which is then reacted with tetraethyl orthosilicate. The weight ratio in said examples can be calculated from the information disclosed. It is 4:1 (Example 1) and 6.7:1 (Example 5).

U.S. Pat. No. 2,657,974 A1 discloses a composition for forming sand molds and cores comprising an unreacted intimate mixture of foundry sand, a solid fusible thermosetting resin binder and a compound taken from the group consisting of tetra alkyl, tetra aralkyl and tetra aryl orthosilicate. More specifically, in examples 1 and 2 a sand-binder mixture is obtained by mulling foundry sand with tetraethyl orthosilicate and adding a dry fusible phenol-formaldehyde resin to this mixture, or by incorporating foundry sand into a preblend of tetraethyl orthosilicate and the dry fusible phenol-formaldehyde resin. In each case the mass ratio phenolic resin/tetraethyl orthosilicate is 12:1 (calculated from the information disclosed). U.S. Pat. No. 2,657,974 A1 does not mention novolaks. Furthermore, U.S. Pat. No. 2,657,974 A1 does not mention curing agents or crosslinking agents.

U.S. Pat. No. 6,465,542 B1 discloses a two-component binder system consisting of a phenol resin component and a polyisocyanate component, the phenol resin component comprising a phenol resin having at least two hydroxy groups per molecule and the polyisocyanate component comprising a polyisocyanate having at least two isocyanate groups per molecule, wherein at least the phenol resin component contains a solvent, and wherein at least one of the phenol resin component and the polyisocyanate component comprises a solvent selected from the group consisting of alkyl silicates, alkyl silicate oligomers and mixtures thereof.

WO 2009/130335 A2 describes the use of a modified phenolic resin as a binder or a component of a binder, a mold material or a component of a mold material, as an insulator or component of an insulator, as a lacquer or component of a lacquer wherein the modified phenolic resin comprises phenolic resin units which are substituted and/or coupled by one or more esters of orthosilicic acid, disilicic acid and/or one or more polysilicic acids and/or wherein the modified phenolic resin is obtainable by reaction of free hydroxy groups of a phenolic resin with one or more esters of orthosilicic acid, disilicic acid and/or one or more polysilicic acids. The resin may comprise novolak units, resol units or high o,o' resol units. In those modified resins obtainable by reacting a novolak phenolic resin with tetraethyl orthosilicate the mass ratio phenolic resin/tetraethyl orthosilicate is preferably 2:1, most preferably 4:1.

It has surprisingly been found that a resin preparable by reaction of a phenol/formaldehyde novolak with tetraethyl orthosilicate in a mass ratio above 28:1, preferably above 30:1, wherein the phenol of the phenol/formaldehyde novolak is substituted or unsubstituted phenol or a mixture of two or more phenols can advantageously be used as a coating and/or binder for particulate material.

Thus, the use of small quantities of tetraethyl orthosilicate (TEOS) in the preparation of a TEOS-modified phenol/formaldehyde novolak and use of such TEOS-modified phenol/formaldehyde novolak for the coating of a particulate material, especially inorganic particulate material results in a coated particulate material, especially coated inorganic particles from which molded articles of improved strength are obtainable.

In the term "phenol/formaldehyde novolak" and in the context of the preceding paragraph the word "phenol" indicates any member of the class of organic compounds having a six-membered aromatic ring of C atoms with a hydroxy group bonded directly to said aromatic ring, as well as mixtures of two or more members of said class. Examples of compounds belonging to this class of compounds are the compound phenol itself (i.e. hydroxybenzene), resorcinol, and other substituted hydroxybenzenes. Throughout the text, "phenols" (plural) indicates members of said class of organic compounds.

Correspondingly, according to the present invention there is provided a resin preparable by reaction of a phenol/formaldehyde novolak with tetraethyl orthosilicate in a mass ratio above 28:1, preferably above 30:1, wherein the phenol of the phenol/formaldehyde novolak is substituted or unsubstituted hydroxybenzene or a mixture of two or more such phenols.

Preferably the mass ratio in which a phenol/formaldehyde novolak and tetraethyl orthosilicate are reacted is so adjusted that the strength of a molded article obtained from a particulate material coated with said resin is increased in comparison to a molded article obtained from a particulate material coated with a phenol/formaldehyde novolak which is not reacted with tetraethyl orthosilicate, but is otherwise identical.

A preferred resin is preparable by catalyzed reaction of a phenol/formaldehyde novolak with tetraethyl orthosilicate, preferably by an acid-catalyzed reaction of a phenol/formaldehyde novolak with tetraethyl orthosilicate.

Tetraethyl orthosilicate (tetraethoxysilane; $Si(OC_2H_5)_4$, CAS Registry Number 78-10-4); hereinbelow also referred to as "TEOS") is an ethyl ester of the orthosilicic acid. It is obtainable by e.g. reacting silicon tetrachloride with ethanol.

In certain preferred embodiments of the present invention the above-defined resin is not part of a mixture consisting of said resin and sand. More preferably the resin as defined above is not part of a mixture comprising said resin and sand. In particularly preferred embodiments of the present invention the resin as defined above is not part of a mixture comprising said resin and any particulate material.

In further preferred embodiments of the present invention the resin as defined above is not cured and not cross-linked.

In certain cases it is particularly preferred that the resin as defined above is not cured and not crosslinked and is not part of a mixture consisting of said resin and sand. More preferably the resin as defined above is not cured and not crosslinked and is not part of a mixture comprising said resin and sand. In particularly preferred embodiments of the present invention the resin as defined above is not cured and not crosslinked and is not part of a mixture comprising said resin and any particulate material.

It is also preferred that the resin as defined above does not comprise tetrabutylorthosilicate and also does not comprise butyl alcohol.

A "phenol/formaldehyde novolak" as used in the preparation of resins according to the present invention is a phenolic resin of the novolak type obtainable by a reaction (condensation polymerization, also referred to as polycondensation) of formaldehyde (which may be employed in the form of an aqueous solution of formaldehyde or as paraformaldehyde) and one or more phenols (as defined above) wherein said reaction is preferably catalyzed by an acid or a divalent metal salt. The acid catalyst is preferably selected from the group consisting of sulfuric acid, hydrochloric acid, oxalic acid, sulfamic acid and paratoluenesulfonic acid. The divalent metal salt is preferably selected from the group consisting of salts of Zn, Mg, Cd, Pb, Cu, Co and Ni. Preferred are the acetates of these metals and very preferred is zinc acetate. Phenolic resins of the novolak type do not contain methylol groups. Novolaks are dissoluble, fusible, not self-curing and storage-stable.

Preferably, the phenol is unsubstituted hydroxybenzene or a mixture of unsubstituted hydroxybenzene with one or more other phenols (other phenols=substituted hydroxybenzenes). Herein, the term "unsubstituted hydroxybenzene" indicates the chemical compound hydroxybenzene, $C_6H_5OH$, CAS Registry Number 108-95-2. The term "hydroxybenzene", if not indicated otherwise, likewise refers to the chemical compound hydroxybenzene, $C_6H_5OH$, CAS Registry Number 108-95-2. The term "other phenols" correspondingly indicates members of the class of organic compounds having a six-membered aromatic ring of C atoms with a hydroxy group bonded directly to said aromatic ring, wherein the member is not hydroxybenzene.

Most preferably, the phenol/formaldehyde novolak is selected from the group consisting of hydroxybenzene-formaldehyde novolak, hydroxybenzene-alkylphenol-formaldehyde novolak, hydroxybenzene-aralkylphenol-formaldehyde novolak, high ortho phenol-formaldehyde novolak, hydroxybenzene-resorcinol-formaldehyde novolak, alkylphenol-resorcinol-formaldehyde novolak, aralkylphenol-resorcinol-formaldehyde novolak, resorcinol-formaldehyde novolak, alkylresorcinol-formaldehyde novolak, alkylresorcinol-resorcinol-formaldehyde novolak, aralkylresorcinol-resorcinol-formaldehyde novolak, and mixtures thereof.

Preferably, the above-defined resin is preparable by reaction of a phenol/formaldehyde novolak with tetraethyl orthosilicate in a mass ratio in the range of from 1000:1 to 28:1, preferably in the range of from 500:1 to 28:1, more preferably in the range of from 200:1 to 28:1, further preferably in the range of from 100:1 to 28:1 and particularly preferably in the range of 50:1 to 28:1.

It has been found that the strength of molded articles made from particulate material coated with a resin prepared by reaction of a phenol/formaldehyde novolak with tetraethyl orthosilicate in a mass ratio below 28:1 is lower in comparison with molded articles made from particulate material coated with a resin prepared by catalyzed reaction of a phenol/formaldehyde novolak with tetraethyl orthosilicate in a mass ratio above 28:1, preferably above 30:1.

Preferably, the phenol/formaldehyde novolak from which the above-defined resin of the present invention is prepared has a molar ratio of phenol to formaldehyde in the range of from 1:0.5 to 1:0.95, preferably in the range of from 1:0.55 to 1:0.9, most preferably in the range of from 1:0.6 to 1:0.85. Herein, the total molar amount of all "phenols" (as defined above) used in the reaction with formaldehyde is considered and is divided by the molar amount of formaldehyde used in the reaction.

In application tests it was found that a molar ratio of formaldehyde to phenol between 0.6 and 0.85 (i.e. a molar ratio of phenol to formaldehyde in the range of from 1:0.6 to 1:0.85) results in the highest strength values. Moreover, with a lower molar ratio of formaldehyde to phenol (reduced portion of formaldehyde), the yield of the novolak typically is lower which has a negative impact on the production costs. A higher molar ratio of formaldehyde to phenol leads to higher yields but also to novolaks with a higher molecular weight going along with a higher viscosity, which makes the coating process of a particulate substrate more difficult. Furthermore, in some cases, the reaction of a novolak having a higher molecular ratio of formaldehyde to phenol with TEOS results in gelation, and results in a resin product with a melting point which is too high for certain uses.

According to another aspect of the present invention, the above defined resin can be used as a coating and/or binder for particulate material.

Thus, the present invention according to this aspect relates to the use of a resin preparable by reaction of a phenol/formaldehyde novolak with tetraethyl orthosilicate in a mass ratio above 28:1, preferably above 30:1, as a coating and/or binder for particulate material, wherein the phenol of the phenol/formaldehyde novolak is substituted or unsubstituted hydroxybenzene or a mixture of two or more such phenols. The use of a resin preparable by a catalyzed reaction of a phenol/formaldehyde novolak with tetraethyl orthosilicate, preferably by an acid-catalyzed reaction of a phenol/formaldehyde novolak with tetraethyl orthosilicate is preferred.

Herein, the above-defined resin is preferably preparable by reaction of a phenol/formaldehyde novolak with tetraethyl orthosilicate in a mass ratio in the range of from 1000:1 to 28:1, preferably in the range of from 500:1 to 28:1, more preferably in the range of from 200:1 to 28:1, further preferably in the range of from 100:1 to 28:1 and particularly preferably in the range of from 50:1 to 28:1.

Herein, the phenol preferably is unsubstituted hydroxybenzene or a mixture of unsubstituted hydroxybenzene with one or more other phenols.

All features of the resin of the present invention characterized hereinabove or hereinbelow as preferred are also preferred in the use of the present invention.

In the uses of the present invention, the particulate material (also referred to as substrate) can be of either natural or synthetic origin. Typically the particulate material is a refractory material. More specifically, the particulate material is preferably selected from the group consisting of natural silica sand, fused aluminum oxide sand, andalusite sand, fused bauxite sand, chamotte sand, chromite sand, corundum sand, mullite sand, olivine sand, zircon sand, zircon mullite sand quartz-feldspate sand and rutile sand, as well as synthetic ceramic particulate materials, hollow spheres, especially glassy hollow spheres and any other particulate material known to the skilled person; and mixtures thereof.

The skilled person is aware that the preferred type of particulate material depends on the intended use of the particulate material, and will select the suitable particulate material according to the intended use.

When foundry sand is used as the particulate material, either new or reclaimed foundry sand may be employed.

More specifically, according to the present invention, the above-defined resin can be used as a coating and/or binder for particulate material
- in a process for the production of resin coated particles, preferably heat curable resin coated particles; or
- in the shell molding process for the production of shell molds and shell cores; or
- in a process of making proppants for use in the hydraulic fracturing process; or
- in a process of making a resin bonded abrasive grinding snagging or cut-off wheel.

Surprisingly it was found that the use of the above-defined resin of the invention as a coating and/or binder for particulate material results in an improved strength level of molded articles made thereof. This means that a smaller amount of resin may be used at the same strength, thus in turn reducing the production costs.

With regard to the use of the above-defined resin as a coating and/or binder for particulate material in the shell molding process for the production of shell molds and shell cores, surprisingly it has been found that this use results in an improved thermal shock resistance, i.e. a diminished tendency of the mold to crack during the casting process. Moreover it has been found that the surface finish can be improved and that gas related casting defects can be minimized since a smaller amount of resin may be used while maintaining the same level of strength as obtainable when a conventional phenol/formaldehyde novolak resin is used as the coating or binder of the same particulate material. Additionally, a reduction in smoke formation during core and mold making was observed that will help to improve working conditions.

Another use as of the above-defined resin of the invention as a coating and/or binder for particulate material relates to a process of making proppants for use in the hydraulic fracturing process. Proppants (also referred to as propping agents) are increasingly important in treating subterranean formations. Proppants are used in the oil and gas extraction industry to hold open formation fractures created by hydraulic fracturing. Hydraulic fracturing is a process that results in the creation of fractures in rocks. The fracturing is done from a wellbore drilled into reservoir rock formations to increase the rate and ultimate recovery of oil and natural gas. Hydraulic fractures may be natural or man-made and are extended by internal fluid pressure which opens the fracture and causes it to extend through the rock. Natural hydraulic fractures include volcanic dikes, sills and fracturing by ice as in frost weathering. Man-made fluid-driven fractures are formed at depth in a borehole and extend into targeted formations. The fracture width is typically maintained after the injection by introducing a proppant into the injected fluid.

Proppant is a particulate material, such as grains of sand, ceramic, or other particulates, that prevents the fractures from closing when the injection is stopped. Proppants having a coating of a resin such as a phenolic resin are known in the art. One of the primary uses of such curable resin-coated proppant is to minimize or prevent proppant flow back from a fracture during cleanup or production in oil and gas wells. In hydraulic fracturing, coated proppant particles are used to maintain the fracture in a propped condition. The resin coating serves to improve the stability of proppants at high closure stresses.

In the shell molding process for the production of shell molds and shell cores as well as in a process of making proppants for use in the hydraulic fracturing process, the formation of a stable bonding between the substrate (particulate material) and the resin resulting in a high strength of the cured substrate (cured resin-coated particulate material) is very important. This aim is achieved by using the above-defined resin of the invention as a coating and/or binder in the shell molding process for the production of shell molds and shell cores as well as in a process of making proppants.

Another use as of the above-defined resin of the invention as a coating and/or binder for particulate material relates to a process of making a resin bonded abrasive grinding, snagging or cut-off wheel. In the manufacture of resin bonded grinding wheels, a measured amount of abrasive grain is mixed with a powdered phenolic resin based bonding composition, then the resulting mix is pressed to form a wheel shape and the resin is cured. Resin bonded grinding wheels that are subjected to the most difficult grinding operations include wheels such as cut-off wheels, billet snagging wheels and foundry snagging wheels used respectively for cutting steel, preparing steel billets for rolling and the like and for foundry snagging operations.

The above-defined resin is preferably used in combination with a crosslinking agent and/or a precursor releasing a crosslinking agent when heated. Herein, "in combination with" preferably means that the crosslinking agent and the resin are present in a mixture. For preferred resin preparations of the invention see below. Preferably, the crosslinking agent (commonly also referred to as curing agent) is an aldehyde, preferably formaldehyde, and/or a methylol phenol (resol). Resols for crosslinking the above-defined resins can be prepared by reacting a phenolic compound with formaldehyde compound in a molar ratio of 1:1 to 1:3 under alkaline reaction conditions. The phenolic compound preferably either is hydroxybenzene or an alkyl or aryl substituted hydroxybenzene or mixtures thereof, the formaldehyde can preferably be provided either as a formaldehyde solution or as solid paraformaldehyde, and the alkaline catalyst is preferably either ammonia, or an oxide or hydroxide of a metal of group IA or IIA of the periodic table of the elements. The reaction temperature is normally in the range between 60 and 100° C. and the reaction time depending on temperature is typically between 30 minutes and 12 hours. Depending on the desired water content and the raw materials used, a dehydration step can follow the condensation reaction.

When a precursor releasing a crosslinking agent (commonly also referred to as curing agent) when heated is applied such precursor is preferably a methylene donor component that generates formaldehyde when heated. Preferred methylene donor components are hexamethylenetetramine (HEXA) or hexamethoxymethylmelamine (HMMM).

Phenol/formaldehyde novolaks are obtainable by catalyzed reaction (condensation polymerization, also referred to as polycondensation) of one or more phenols with formaldehyde in a molar ratio of phenol to formaldehyde of more than 1, wherein the catalyst is preferably selected from the group consisting of acids and divalent metal salts. In phenol/formaldehyde novolaks, the phenolic units are mainly linked by methylene bridges. The acid catalyst is preferably selected from the group consisting of sulfuric acid, hydrochloric acid, oxalic acid, sulfamic acid and paratoluenesulfonic acid. The divalent metal salt is preferably selected from the group consisting of salts of Zn, Mg, Cd, Pb, Cu, Co and Ni. Preferred are the acetates of these metals and very preferred is zinc acetate.

In the preparation of phenol/formaldehyde novolaks, for safety reasons it is common practice to preload a phenol and the catalyst. To this premix formaldehyde is slowly added at a reaction temperature of about 100° C., followed by a post reaction period to decrease the level of free formaldehyde to below 1%. The reaction step can be followed by a neutralization step. To remove water and unreacted phenols a distillation step is carried out. The final product is a polymer that is solid at room temperature and that has a melting point between 50 and 110° C. Phenol/formaldehyde novolaks are storage stable and can be cured by addition of a cross linking agent.

If the above-defined resin of the present invention is used in combination with (preferably: in admixture with) a crosslinking agent and/or a precursor releasing a crosslinking agent when heated, crosslinking (commonly also referred to as curing) of the resin is initiated by heat, in particular when the resin is used as a binder and/or coating for a particulate material.

According to a related aspect of the invention there is provided a process of coating and/or binding a particulate material wherein said particulate material is coated and/or bonded with a resin preparable by reaction of a phenol/formaldehyde novolak with tetraethyl orthosilicate in a mass ratio above 28:1, wherein the phenol of the phenol/formaldehyde novolak is substituted or unsubstituted hydroxybenzene or a mixture of two or more such phenols.

Preferably the phenol is unsubstituted hydroxybenzene or a mixture of unsubstituted hydroxybenzene with one or more other phenols.

In the process of the invention as defined above, it is preferred that the resin is a resin which is preparable by catalyzed reaction of a phenol/formaldehyde novolak with tetraethyl orthosilicate in a mass ratio in the range of from 1000:1 to 28:1, preferably in the range of from 500:1 to 28:1, more preferably in the range of from 200:1 to 28:1, further preferably in the range of from 100:1 to 28:1 and particularly preferably in the range of from 50:1 to 28:1.

In the process of the invention as defined above, the resin is preferably used in combination with a crosslinking agent and/or a precursor releasing a crosslinking agent when heated. Preferably, the crosslinking agent is an aldehyde, preferably formaldehyde, and/or a resol. When a precursor releasing a crosslinking agent (commonly also referred to as curing agent) when heated is applied such precursor is preferably a methylene donor component that generates formaldehyde when heated. Preferred methylene donor components are hexamethylenetetramine (HEXA) or hexamethoxymethylmelamine (HMMM).

Preferably, the phenol/formaldehyde novolak from which the above-defined resin of the present invention is prepared has a molar ratio of phenol to formaldehyde in the range of from 1:0.5 to 1:0.95, preferably in the range of from 1:0.55 to 1:0.9, most preferably in the range of from 1:0.6 to 1:0.85.

Another aspect of the present invention relates to a process
for the production of resin coated particles, preferably heat-curable resin-coated particles; or
for the production of shell molds and shell cores in the shell molding process; or
of making proppants for use in the hydraulic fracturing process; or
of making a resin bonded abrasive grinding, snagging or cut-off wheel,
comprising a process of coating and/or binding a particulate material wherein said particulate material is coated and/or bonded with a resin preparable by reaction of a phenol/formaldehyde novolak with tetraethyl orthosilicate in a mass ratio above 28:1, wherein the phenol of the phenol/formaldehyde novolak is substituted or unsubstituted hydroxybenzene or a mixture of two or more such phenols.

According to a related aspect of the invention there is provided a resin-coated particulate material or mixture of particulate material with a resin, the particulate material or mixture comprising (or consisting of) inorganic particles coated by or mixed with, respectively, a resin according to the present invention as defined above. As to preferred uses of the resin-coated particulate material of the invention see below. The resin is preferably used in combination with additives, e.g. crosslinking agents. Thus, the resin is typically employed in the form of a resin preparation. For preferred resin preparations see below.

The inorganic particles can be of either natural or synthetic origin. Typically the inorganic particles are particles of a particulate material which is a refractory material. More specifically, the particulate material is preferably selected from the group consisting of natural silica sand, fused aluminum oxide sand, andalusite sand, fused bauxite sand, chamotte sand, chromite sand, corundum sand, mullite sand, olivine sand, zircon sand, zircon mullite sand quartz-feldspate sand and rutile sand, as well as synthetic ceramic particulate materials, hollow spheres, especially glassy hollow spheres and any other particulate material known to the skilled person; and mixtures thereof. The skilled person is aware that the preferred type of inorganic particulate material depends on the intended use of the particulate material, and will select the suitable inorganic particulate material according to the intended use.

When foundry sand is used as the inorganic particulate material, either new or reclaimed foundry sand may be employed.

More specifically, a resin-coated particulate material of the present invention or a mixture of particulate material with a resin of the present invention preferably comprises heat curable resin coated particles. Those particles may be used, e.g., in the shell molding process for the production of shell molds and shell cores, in a process of making proppants for use in the hydraulic fracturing process; in a process of making a resin bonded abrasive grinding, snagging or cut-off wheel.

In a resin-coated particulate material of the present invention or a mixture of particulate material with a resin of the present invention the amount of said resin is preferably in the range of from 1 to 5 wt.-%, preferably 1 to 3 wt.-%, based on the total weight of the resin-coated particulate material. As mentioned above, it was found that the use of the above-defined resin of the invention as a coating and/or binder for particulate material results in an improved strength level of molded articles made thereof. This means that a smaller amount of resin may be used at the same strength, thus in turn reducing the production Costs.

Preferably, in the resin-coated particulate material or in the mixture of particulate material of the present invention, the above-defined resin is curable by crosslinking or the particulate material or mixture is a cured resin-coated particulate material or mixture (i.e. the resin in the particulate material or mixture is already cured, preferably by crosslinking). Preferably, in a resin-coated particulate material of the present invention the resin is curable by crosslinking. Further preferably, in a resin-coated particulate material of the present invention the resin coating comprises a crosslinking agent and/or a precursor releasing a crosslinking agent when heated. The resin coating in such cases can be considered as or as prepared from a resin preparation comprising the resin of the present invention and certain additive(s) (in this instance: crosslinking agent or precursor). For (further) preferred resin preparations of the invention see the detailed discussion above and below.

The crosslinking agent (also referred to as curing agent) is an aldehyde, preferably formaldehyde, and/or a methylol phenol (resol). Resols for crosslinking the above-defined resins can be prepared by reacting a phenolic compound with a formaldehyde compound in a molar ratio of 1:1 to 1:3 under alkaline reaction conditions. The phenolic compound can either be hydroxybenzene or an alkyl or aryl substituted hydroxybenzene or mixtures thereof, the formaldehyde can be either formaldehyde solution or solid paraformaldehyde and the alkaline catalyst either ammonia, or an oxide or hydroxide of a metal of group IA or IIA of the periodic table of the elements. The reaction temperature is normally in the range between 60 and 100° C. and the reaction time depending on temperature between 30 minutes and 12 hours. Depending on the desired water content and the raw materials used, a dehydration step can follow the condensation reaction.

When a precursor releasing a crosslinking agent (also referred to as curing agent) when heated is applied such precursor is preferably a methylene donor component that generates formaldehyde when heated. Preferred methylene donor components are hexamethylenetetramine (HEXA) or hexamethoxymethylmelamine (HMMM).

Additionally, a resin-coated particulate material or mixture of particulate material with a resin of the present invention may comprise one or more additional resin, e.g. an unmodified phenol/formaldehyde novolak resin, a furan resin, and/or phenolic resol resin and/or one or more additives like one or more accelerators, e.g. metal chlorides or metal nitrates and/or one or more release agents, e.g. calcium stearate or zinc stearate and/or natural or synthetic waxes, in combination with the resin of the present invention. In a resin-coated particulate material or mixture of particulate material with a resin of the present invention which comprises one or more additional resins, the resin according to the invention amounts to 50 wt.-% or more, preferably to 80 wt.-% or more, of the total amount of resins present. Preferably, the resin-coated particulate material or mixture of particulate material with a resin of the present invention does not comprise any additional resin which is preparable by reaction of a phenol-formaldehyde novolak with TEOS, and more preferably it does not comprise any additional resin which is preparable by reaction of a phenol-formaldehyde novolak with a silane.

Preferably, in the resin-coated particulate material or mixture of particulate material with a resin of the present invention the average particle diameter of the inorganic particles is >100 µm, preferably >150 µm, more preferably in the range of from 100 µm to 2000 µm, most preferably in the range of from 150 µm to 1000 µm. The skilled person is aware that the preferred average particle diameter of the inorganic particles depends on the intended use of the particles and will select the suitable particle size according to the intended use. The average particle diameter of the inorganic particles is determined according to DIN 66165-1 and DIN 66165-2.

The present invention also relates to the use of a resin-coated particulate material according to the present invention (as discussed above)
- in the shell molding process for the production of shell molds and shell cores; or
- as proppants for use in the hydraulic fracturing process; or
- in a process of making a resin bonded abrasive grinding, snagging or cut-off wheel.

This use corresponds to the use of the resins of the present invention as discussed above.

The present invention also relates to a shell molding process for the production of a shell mold or a shell core, comprising the steps of
- preparing or providing a resin-coated particulate material according to the present invention (as discussed above)
- producing a shell mold or a shell core comprising said resin-coated particulate material.

The present invention also relates to a hydraulic fracturing process, comprising the step of
- forming a fracture in a reservoir rock formation
- injecting a fluid into the fracture
- introducing a proppant into the injected fluid, said proppant comprising or consisting of a resin-coated particulate material according to the present invention (as discussed above)

The present invention also relates to a process of making a resin bonded abrasive grinding, snagging or cut-off wheel, comprising the steps of
- preparing or providing a resin-coated particulate material according to the present invention (as discussed above) wherein the inorganic particles comprise abrasive grains
- pressing the material to form a wheel
- curing the resin.

The present invention also relates to a resin preparation comprising
- a resin according to the present invention (preferably with features indicated above as being preferred),
and one or more of the following constituents:
- a crosslinking agent and/or a precursor releasing a crosslinking agent when heated, wherein the crosslinking agent is preferably selected from the group consisting of formaldehyde and resols, and wherein the precursor is preferably hexamethylenetetramine (for details regarding further preferred crosslinking agents and precursors, see above and below), and
- a further resin (regarding the use of further resins, e.g. furan resins, see above and below).

As discussed above, the resin of a resin-coated particulate material of the invention or mixture of the invention (mixture of particulate material with a resin) is typically used in combination with one or more of the further constituents of the resin preparation of the invention, i.e. the resin is typically used in the form of a resin preparation of the present invention.

In preferred resin preparations of the present invention, the resin according to the invention amounts to 30 wt.-% or more, preferably to 80 wt.-% or more, of the total amount of resins used.

If in a resin preparation of the present invention hexamethylenetetramine (hexa) is used as precursor releasing a crosslinking agent when heated, it is preferably present in an amount in the range of 5.0 to 18.0% by weight, based on the amount of the total resin used.

According to a further aspect of the invention there is provided a method of making a resin according to the present invention as defined above. The method comprises the following steps:
- preparing or providing a phenol/formaldehyde novolak, wherein the phenol of the phenol/formaldehyde novolak is substituted or unsubstituted hydroxybenzene or a mixture of two or more such phenols,
- reacting the phenol/formaldehyde novolak with tetraethyl orthosilicate in a mass ratio above 28:1, preferably above 30:1,
- optionally distilling the product of the reaction of the phenol/formaldehyde novolak with tetraethyl orthosilicate to at least partially remove the ethanol formed during said reaction.

Preferably, the phenol/formaldehyde novolak is reacted with tetraethyl orthosilicate in the presence of a catalyst, preferably in the presence of an acid catalyst.

Preferably, the distillation of the product of the reaction of the phenol/formaldehyde novolak with tetraethyl orthosilicate to at least partially remove the ethanol formed during the reaction is carried out under vacuum.

The phenol/formaldehyde novolak provided or prepared in the above-defined method of the present invention preferably has a molar ratio of phenol to formaldehyde in the range from 1:0.5 to 1:0.95, preferably in the range from 1:0.55 to 1:0.9, most preferably in the range from 1:0.60 to 1:0.85.

In application tests it was found that a molar ratio of formaldehyde to phenol between 0.6 and 0.85 (i.e. a molar ratio of phenol to formaldehyde in the range of 1:0.6 to 1:0.85) results in the highest strength values. Moreover, with a lower molar ratio of formaldehyde to phenol (reduced portion of formaldehyde), the yield of the novolak typically is lower which has a negative impact on the production costs. A higher molar ratio of formaldehyde to phenol leads to higher yields but also to novolaks with a higher molecular weight going along with a higher viscosity, which makes the coating process of a particulate substrate more difficult. Furthermore, in some cases, the reaction of a novolak having a higher molecular ratio of formaldehyde to phenol with TEOS results in gelation, and results in a resin product with a melting point which is too high for certain uses.

If an acid is used as a catalyst in the above-defined method of the present invention said acid is preferably selected from the group consisting of sulfuric acid, hydrochloric acid, salicylic acid, sulfamic acid, and paratoluenesulfonic acid.

Preferably, reacting the phenol/formaldehyde novolak with tetraethyl orthosilicate is carried out at a temperature in the range from 100 to 150° C., most preferably of from 135 to 145° C.

According to a related aspect of the invention there is provided a method of making a resin-coated particulate material comprising the following steps:

providing a resin according to the present invention as defined above or making a resin according to the method of the present invention as defined above,
providing inorganic particles,
coating said inorganic particles with said resin.

As described above, in the method of making a resin-coated particulate material according to the present invention, the resin is typically used in combination with one or more of the further constituents of the resin preparation of the invention, i.e. the provided or made resin is typically used in the form of a resin preparation of the present invention. Preferred resin preparations of the present invention are described in more detail above and below.

The inorganic particles to be coated with the resin of the present invention can be of either natural or synthetic origin. Typically the inorganic particles are particles of a particulate material which is a refractory material. More specifically, the particulate material is preferably selected from the group consisting of natural silica sand, fused aluminum oxide sand, andalusite sand, fused bauxite sand, chamotte sand, chromite sand, corundum sand, mullite sand, olivine sand, zircon sand, zircon mullite sand quartz-feldspate sand and rutile sand, as well as synthetic ceramic particulate materials, hollow spheres, especially glassy hollow spheres and any other particulate material known to the skilled person; and mixtures thereof. The skilled person is aware that the preferred type of particulate material depends on the intended use of the particulate material and will select the suitable particulate material according to the intended use.

When foundry sand is used as the particulate material, either new or reclaimed foundry sand may be employed.

More specifically, a resin-coated particulate material of the present invention or a mixture of particulate material with a resin of the present invention may comprise heat curable resin coated particles. Those particles may be used, e.g., in the shell molding process for the production of shell molds and shell cores, in a process of making proppants for use in the hydraulic fracturing process or in a process of making a resin bonded abrasive grinding, snagging or cut-off wheel.

In the above-defined method of making a resin-coated particulate material, the coating of the inorganic particles with the resin can be achieved by means of the hot coating or warm coating process which per se are known in the art.

The present invention also relates to shell molds or shell core preparable by the shell molding process using a resin according to the present invention (as discussed above and below in more detail)
or
a resin-coated particulate material or mixture according to the present invention (as discussed above and below in more detail)
or
a resin preparation according to the present invention (as discussed above and below in more detail).

In the following the invention is further explained by examples. In the examples the term "resin" either identifies a pure resin without additives or identifies a resin preparation. In this regard, a solution of a resin in a solvent is also considered as a resin preparation. For instance, in the warm coating process, typically a resin preparation in the form of a resin solution is applied.

EXAMPLES

I. Resin Preparation

Preparation of a Phenol/Formaldehyde Novolak (Intermediate Product Resin 1):

A novolak resin is manufactured according to the following procedure: 519.5 g hydroxybenzene are preloaded in a 2 liter three-necked flask equipped with stirrer, dropping funnel, condenser, thermometer and heating/cooling bath. To the hydroxybenzene 1.85 g oxalic acid are added as a catalyst and the reaction mixture is heated to a temperature of 90° C. To this mixture 240 g formaldehyde solution (49 wt.-% formaldehyde) are added over 90 minutes through the dropping funnel under reflux. After finishing of the addition of the formaldehyde solution the mixture is kept for 2 hours at reflux. Excess water and hydroxybenzene are distilled off, first under atmospheric pressure and then followed by vacuum distillation up to a temperature of 180° C. and until the free hydroxybenzene content of the product is 1 wt.-%. Afterwards the product is flaked. The product yield is 500 g. The product is referred to as "Resin 1".

Preparation of a Phenol/Formaldehyde Novolak with Additional Amount of Salicylic Acid (Comparison Product, Resin 1a):

100 g of a novolak manufactured according to example 1 (Resin 1) are heated to 140° C. in a glass flask and 3 g salicylic acid are added at 140° C. and stirred in for 5 minutes until dissolved completely. Afterwards the resin is flaked. The flaked resin is referred to as "Resin 1a".

Preparation of a TEOS Modified Phenol/Formaldehyde Novolak According to the Present Invention (Resin 1b):

100 g of a novolak manufactured according to example 1 (resin 1) are heated to 140° C. in a glass flask. 3 g salicylic acid as a catalyst are added at 140° C. and stirred in for 5 minutes until dissolved completely. Thereafter 2.5 g tetraethyl orthosilicate (2.4 wt.-% TEOS based on the total weight of novolak, salicylic acid and TEOS, corresponding to 0.71 wt.-% $SiO_2$ based on the total weight of novolak. are added through a dropping funnel in about 15 minutes and the mixture is reacted for 30 minutes at 140° C. Vacuum is applied to remove ethanol that is formed during the reaction and afterwards the resin is flaked. The flaked resin is referred to as "Resin 1b".

Preparation of a Phenol/Formaldehyde Novolak (Intermediate Product, Resin 2):

A phenol/formaldehyde novolak is manufactured by reacting hydroxybenzene and a formaldehyde solution (49.5 wt.-% formaldehyde) in a molar ratio hydroxybenzene/formaldehyde of 1/0.65 using sulfuric acid as a catalyst in a 2 liter three-necked flask equipped with stirrer, dropping funnel, condenser, thermometer and heating/cooling bath. To the preloaded hydroxybenzene the sulfuric acid catalyst is added and the reaction mixture is heated to 90° C. To this mixture 240 g formaldehyde solution (49 wt.-% formaldehyde) are added over 90 minutes through the dropping funnel under reflux. After finishing of the addition of the formaldehyde solution the mixture is kept for 2 hours at reflux and the sulfuric acid is neutralized to a pH of 3.0 to 3.5 with an oxide or hydroxide of a group IA or IIA metal.

Excess water and hydroxybenzene are distilled off, first under atmospheric pressure and then followed by vacuum distillation, up to a temperature of 180° C. and a free hydroxybenzene content of 1.8 wt-%. Afterwards the product is flaked. The flaked product is referred to as "Resin 2".

Preparation of a TEOS Modified Phenol/Formaldehyde Novolak According to the Present Invention (Resin 2a):

100 g of a novolak manufactured according to example 2 are loaded into a round bottom flask and heated to 140° C. At this temperature 1.0 g tetraethyl orthosilicate (0.99 wt.-% TEOS based on the total weight of novolak and TEOS, corresponding to 0.29 wt.-% $SiO_2$ content based on the weight of novolak are added through a dropping funnel and reacted with the phenol/formaldehyde novolak at 140° C. for 15 minutes. At the end of the reaction the product is distilled under vacuum to remove the ethanol formed during the reaction and then flaked. The flaked product is referred to as "Resin 2a".

Preparation of a TEOS Modified Phenol/Formaldehyde Novolak According to the Present Invention (Resin 2b):

100 g of a novolak manufactured according to example 2 are loaded into a round bottom flask and heated to 140° C. At this temperature 2.5 g tetraethyl orthosilicate (2.4 wt.-% TEOS based on the total weight of novolak and TEOS corresponding to 0.72 wt.-% $SiO_2$ content based on the weight of novolak are added through a dropping funnel and reacted with the phenol/formaldehyde novolak at 140° C. for 15 minutes. At the end of the reaction the product is distilled under vacuum to remove the ethanol formed during the reaction and then flaked. The flaked product is referred to as "Resin 2b".

Preparation of a TEOS-Modified Resin not According to the Present Invention (Comparison Product with Excess of TEOS Added, Resin 2c):

100 g of a novolak manufactured according to example 2 are loaded into a round bottom flask and heated to 140° C. At this temperature 5.0 g tetraethyl orthosilicate (4.76 wt.-% TEOS based on the total weight of novolak and TEOS; corresponding to 1.44 wt.-% $SiO_2$ content based on the weight of novolak are added through a dropping funnel and reacted with the phenol/formaldehyde novolak at 140° C. for 15 minutes. At the end of the reaction the product is distilled under vacuum to remove the ethanol formed during the reaction and then flaked. The flaked product is referred to as "Resin 2c".

Preparation of a TEOS-Modified Resin not According to the Present Invention (Comparison Product with Excess of TEOS Added, Resin 2d):

100 g of a novolak manufactured according to example 2 are loaded into a round bottom flask and heated to 140° C. At this temperature 10.0 g tetraethyl orthosilicate (9.09 wt.-% TEOS based on the weight of novolak and TEOS corresponding to 2.8 wt.-% $SiO_2$ content based on the weight of novolak are added through a dropping funnel and reacted with the phenol/formaldehyde novolak at 140° C. for 15 minutes. The product gelled and could not be flaked or tested. The gelled product is referred to as "Resin 2d".

Preparation of a Solution of a Phenol/Formaldehyde Novolak with Additional Amount of Salicylic Acid (Comparison Product, Resin 3a):

A phenol/formaldehyde novolak solution in methanol for use in the warm coating process is manufactured according to the following procedure: 588 g hydroxybenzene is preloaded in a 2 liter three-necked flask equipped with stirrer, dropping funnel, condenser, thermometer and heating/cooling bath. To the hydroxybenzene 0.4 g oxalic acid are added as a catalyst and the reaction mixture heated to 90° C. To this mixture 293 g formaldehyde solution (50 wt.-% formaldehyde) are added through a dropping funnel under reflux and over 90 minutes. When the addition is finished the mixture is kept for 2 hours at reflux. Excess water and hydroxybenzene are distilled off, first under atmospheric pressure followed by a vacuum distillation. The final distillation temperature is 170° C. The free hydroxybenzene content of the novolak is below 2 wt.-%. To this product 26.5 g salicylic acid, 47 g water and 353 g methanol are added. The batch is cooled to below 40° C. The product yield is 485 g. The product is referred to as "Resin 3a".

Preparation of a Solution of a Resin According to the Present Invention (TEOS Modified Phenol/Formaldehyde Novolak, Resin 3b):

A phenol/formaldehyde novolak solution for the warm coating process is manufactured according to the following procedure: 588 g hydroxybenzene is preloaded in a 2 liter three-necked flask equipped with stirrer, dropping funnel, condenser, thermometer and heating/cooling bath. To the hydroxybenzene 0.4 g oxalic acid as a catalyst are added and the reaction mixture heated to 90° C. To this mixture 293 g formaldehyde solution (50 wt.-% formaldehyde) are added through a dropping funnel under reflux and over 90 minutes. When the addition is finished the mixture is kept for 2 hours at reflux. Excess water and hydroxybenzene are distilled off, first under atmospheric pressure followed by a vacuum distillation. The final distillation temperature is 170° C. The free hydroxybenzene content of the phenol/formaldehyde novolak is below 2 wt.-%, To this product 26.5 g salicylic acid are added and mixed until dissolved. To this product 14.7 g tetraethyl orthosilicate (TEOS) are added within 60 minutes under reflux. After a holding time of 60 minutes 47 g water and 353 g methanol are added. The batch is cooled to below 40° C. The product yield is 1000 g. The product is referred to as "Resin 3b". The tetraethyl orthosilicate content based on solid matter (excluding water and methanol) is 2.45 wt.-% corresponding to a $SiO_2$ content of 0.72 wt.-% based on solid phenol/formaldehyde novolak.

Preparation of a Phenol/Formaldehyde Novolak with Additional Amount of Salicylic Acid (Comparison Product, Resin 4a):

100 g Corrodur 7839, a sulfuric acid catalyzed and plasticized phenol/formaldehyde novolak from Huettenes Albertus Chemische Werke GmbH in Germany is loaded into a round bottom flask and heated to 140° C. At this temperature 3 g salicylic acid are added and mixed well until completely dissolved. Afterwards the product is flaked. The flaked product is referred to as "Resin 4a"

Preparation of a Resin According to the Present Invention (TEOS Modified Phenol/Formaldehyde Novolak, Resin 4b):

100 g of Corrodur 7839, a sulfuric acid catalyzed and plasticized phenol/formaldehyde novolak from Huettenes Albertus Chemische Werke GmbH in Germany is heated to 140° C. in a glass flask and 3 g salicylic acid as a catalyst are added. The mix is stirred for 5 minutes until the salicylic acid is dissolved completely. After this 3.0 g tetraethyl orthosilicate (2.8 wt.-% TEOS based on the total weight of novolak, salicylic acid and TEOS, corresponding to 0.80 wt.-% $SiO_2$ content based on the total weight of novolak, salicylic acid and TEOS are added through the dropping funnel and the mixture reacted for 30 minutes at 140° C. Vacuum is applied to remove ethanol that is formed during the reaction and afterwards the resin is flaked. The flaked product is referred to as "Resin 4b"

Preparation of Resins According to the Present Invention (TEOS Modified Phenol/Formaldehyde Novolak, Resins 5a, 5b, 5c):

Resins 5a, 5b and 5c are prepared in a manner analogous to resin 1 but with different molar ratios hydroxybenzene/formaldehyde. Resin 5a had a molar ratio of 1/0.6, resin 5b of 1/0.7 and resin 5c of 1/0.8. All samples are modified with 2.4% tetraethyl orthosilicate according to procedure used in the manufacturing of resin 1b.

The characteristics of the resins 1a, 1b, 2, 2a, 2b, 2c, 3a, 3b, 4a and 4b are compiled in table 1:

TABLE 1

Resin characteristics

| | Free hydroxy-benzene [%] | Water content [%] | Solid content [%] 2 g, 3 h, 135° C. | Melt viscosity [mPas] @ 120° C. | Viscosity [mPas] @25° C. | pH (10% Resin suspension in isopropanol/ water: 75/25) | Mw [g/mol] |
|---|---|---|---|---|---|---|---|
| Resin 1a | 1.0 | 0 | — | 8.9 | Solid | 3.4 | 1396 |
| Resin 1b | 1.5 | 0 | — | 12.8 | Solid | 3.4 | 1538 |
| Resin 2 | 1.8 | 0 | — | 2.2 | Solid | 3.3 | |
| Resin 2a | 1.3 | 0 | — | 2.5 | Solid | 3.7 | |
| Resin 2b | 1.2 | 0 | — | 2.6 | Solid | 3.6 | |
| Resin 2c | 1.3 | 0 | — | 3.3 | Solid | 3.6 | |
| Resin 3a | <1.5 | 4-6 | 60-65 | Liquid | 200-400 | — | — |
| Resin 3b | <1.5 | 4-6 | 60-65 | Liquid | 200-400 | — | — |
| Resin 4a | 1.0 | 0.1 | >99 | — | solid | 3.0 | — |
| Resin 4b | 1.0 | 0.1 | >99 | — | solid | 3.0 | — |

II Coating Methods

The resins prepared as described above are used to coat different substrates (particulate materials). Analysis of the substrates prior to the coating gives the following characteristics (table 2):

TABLE 2

Substrate analysis

| No. | Substrate Name, Type | LOI [%] | AFS No. | pH value | Conductivity [μS] | ADV [AFS method] | Fines [%] |
|---|---|---|---|---|---|---|---|
| 1 | H33, new quartz sand | 0.18 | 52.5 | 7.4 | 12 | 10.5 | 0.3 |
| 2 | Bauxite sand (synthetic Bauxite) | 0.0 | 49.9 | 8.7 | — | 2.6 | 0.0 |
| 3 | Reclaimed quartz sand Type V | 0.07 | 66.5 | 7.8 | 65 | 67 | 0.2 |
| 4 | Cerabeads 650 (Mullite) | 0.04 | 66.5 | 7.8 | 7 | 152 | 0.36 |
| 5 | Nugent 480, quartz sand | 0.27 | 48.6 | 8.1 | — | 3.4 | — |
| 6 | AQ 90-500, quartz sand | 0.11 | 82.6 | 6.0 | — | 0.1 | — |

Substrate coating processes are carried out according to the following methods:
Coating Method 1a (Resins 1a, 1b and 5a, 5b and 5c; Hot Coating Process):

3000 g of the substrate (No. 1, 3 or 4 of table 2, preheated to 150° C.) are transferred to a mixer that is preheated to 120° C. 60 g of the selected resin (1a, 1b) and the 3000 g substrate are mixed for 60 seconds until all resin particles are molten and mixed uniformly with the substrate. Afterwards 18 g of a hexamethylenetetramine solution (35 wt.-% in water) are added and mixed for an additional 60 seconds. Finally 6 g calcium stearate powder are added and mixed for 15 seconds. Then the resin coated substrate is disco charged onto a tray, cooled to room temperature and sieved through a sieve to separate lumps and coarser particles from the coated substrate. The resin coated substrate (RCS) is transferred to plastic containers and kept there until used.

The same coating method is used with substrate 1 (see table 2) and each of resins 5a, 5b, 5c.
Coating Method 1b (Resins 4a, 4b; Hot Coating Process):

3000 g of the substrate (No. 1 of table 2, preheated to 150° C.) are transferred to a mixer that is preheated to 120° C. 90 g of the selected resin (4a or 4b) and the 3000 g substrate 1 are mixed for 60 seconds until all resin particles are molten and mixed uniformly with the substrate. Afterwards 27 g of a hexamethylenetetramine solution (35 wt.-% in water) are added and mixed for an additional 60 seconds. Finally 6 g calcium stearate powder are added and mixed for 15 seconds. Then the resin coated substrate is discharged onto a tray, cooled to room temperature and sieved through a sieve to separate lumps and coarser particles from the coated substrate. The resin coated substrate (RCS) is transferred to plastic containers and kept there until used.

Coating Method 2 (Resins 2, 2a, 2b, 2c, Hot Coating Process):

1000 g substrate (No. 5 of table 2, preheated to 140° C.) are transferred to a substrate coating mixer and mixed while cooling down to a starting substrate temperature of 132° C. At this temperature the selected resin (2, 2a, 2b, or 2c) is added in the quantity given in table 3 and mixed with the substrate for 90 seconds. Then hexamethylenetetramine solution (30 wt.-% hexamethylenetetramine) and water are added in the quantities given in table 3 and mixed for about 60 seconds until "breakup". The "breakup point" is defined as the moment when the mixture changes from highly viscous to free flowing. After "breakup", 0.8 g calcium stearate powder are added followed by an additional 60 seconds mixing time. The resin coated substrate is then discharged from the mixer, screened through a 20 mesh sieve and cooled down before testing. The resins manufactured according to examples 2, 2a, 2b, 2c are used to coat Nugent 480 substrate (no. 5 of table 2), each with the four different resin contents given in table 3, thus yielding in total 16 different resin coated substrate (RCS) samples. Resin 2d could not be tested since it "gelled" during production.

TABLE 3

Recipes for substrate coating method 2

| Resin content of the coated substrate [%] | Quantity of Nugent 480 substrate [g] | Quantity of Resin [g] | Quantity of 30 wt.-% hexamethyl-enetetramine solution [g] | Quantity of Water [g] | Quantity of Calcium-stearate [g] |
|---|---|---|---|---|---|
| 1.4 | 1000 | 14 | 7.6 | 5.0 | 0.8 |
| 1.2 | 1000 | 12 | 6.5 | 5.8 | 0.8 |
| 1.0 | 1000 | 10 | 5.4 | 6.5 | 0.8 |
| 0.8 | 1000 | 8 | 4.3 | 7.3 | 0.8 |

Coating Method 3 (Resin Solutions 3a, 3b; Warm Coating Process):

400 g substrate (No. 6 of table 2, preheated to 80° C.) are transferred to a mixer followed by 27 g of a premixed solution consisting of: 24.1 g resin solution (3a or 3b), 2.4 g solid hexamethylenetetramine and 0.5 g calcium stearate. The mixing is done under vacuum to remove the methanol and carried out until "breakup. The "breakup point" is defined as the moment when the mixture changes from highly viscous to free flowing. This takes 160 seconds at about 70° C. Mixing is continued for additional 60 seconds at 70° C. under vacuum to remove the ethanol formed during the reaction. Then 0.25 g of calcium stearate are added and the mixing is continued for additional 60 seconds. The resin-coated substrate is then discharged from the mixer onto a tray, cooled to room temperature, screened through a 20 mesh sieve and cooled down before testing.

Substrate Coating Method 4 (Resins 2, 2b; Hot Coating Process):

3000 g of the substrate (No. 2 of table 2 preheated to 170° C.) are transferred to a mixer that is preheated to 100° C. 60 g of the selected resin (2, 2b) and the 3000 g substrate 2 are mixed for 90 seconds until all resin particles are molten and mixed uniformly with substrate 2. Afterwards 25.6 g of a hexamethylenetetramine solution (35 wt.-% in water) are added and mixed for 60 seconds. Finally 3 g calcium stearate powder are added and mixed for 10 seconds. Then the resin coated substrate is discharged onto a tray, cooled to room temperature and sieved through a sieve to separate lumps and coarser particles from the coated substrate. The resin coated substrate (RCS) is transferred to plastic containers and kept there until use.

III Test Methods

Test methods 1 and 2: Hot and cold transverse strength (substrates coated with any of resins 1a, 1b, 4a, 4b, 5a, 5b, 5c)

Test specimens are produced using a 2.5 liter ROEPER core shooter by shooting the rein-coated substrate into a double cavity core box with 600 kPa shooting pressure to manufacture two GF-transverse strength test bars according to VDG P-74 (published by "Verein deutscher Eisenhütten-leute", 2$^{nd}$ edition, March 1976). The two specimens are cured for 120 seconds at 220° C. 15 seconds after the curing is finished the first specimen is tested hot in a transverse strength testing machine (hot transverse strength). The second specimen is cooled to room temperature and used to determine the cold transverse strength (method 2). All tests are run in duplicate.

Test Method 3: Hot Tensile Testing (Substrates Coated with any of Resins 2, 2a, 2b, 2c, 3a, 3b)

"Dog-bone style" test specimens with a thickness of 6.35 mm (0.5 inch) are produced using a Dietert 365-A Hot Tensile Tester. The coated substrate is compacted by hand into the core box, struck off and cured for 180 seconds at 232° C. The hot tensile strength is determined directly in the same machine. All tests are run in triplicate.

Test Method 4: Cold Transverse Strength Testing (Substrates Coated with any of Resins 2, 2a, 2b, 2c)

Cold transverse strengths are determined using Shell Mold Bending Strength Tester S-30B manufactured by Tosoku Measuring Instruments Co. Two test specimens (1 cm thick by 3 cm wide by 8.5 cm long) are produced by dumping the coated substrate into a core box heated to 232° C. and curing for 180 seconds. The specimens are cooled to 20° C. in a chiller prior to determining the transverse strengths.

Test Method 5: Cold Tensile Testing (Substrates Coated with any of Resins 3a and 3b)

Test specimens are produced using a Dietert 362 machine to make 6.35 mm (0.25 inch) thick "dog-bone style" test specimen. Coated substrate is compacted by hand into the core box, struck off, cured for 180 seconds at 230° C., and cooled to room temperature before testing. The strength is determined using a Dietert 612 Tensile Tester. All tests are run in triplicate.

Test Method 6: Stick Point [° C.] of the Coated Substrate

The stick point of the coated substrate is determined by applying a bead of coated substrate along a brass bar heated with a temperature gradient of about 154° C. at the hot end and 65° C. at the cooler end. After 60 seconds, the substrate is blown off using air at a pressure of 69 kPa, and the temperature at the point on the bar where the coated substrate sticks is determined. The results are the average of three individual readings.

Test Method 7: "Thermoshock Test"

To compare the "thermo shock" resistance of cores made with resin coated substrates the following test can be performed: Firstly, a round core (diameter of about 10 cm, thickness of 1 cm) has to be made by baking the resin coated substrate in a preheated core box for 2 minutes at 220° C. When cooled down to room temperature, this core will be placed on a preheated infrared lamp from Edmund Bühler, Germany, with a temperature of 450° C. Since the core is only heated from one side and due to the thermal expansion of the substrate grains the core will crack after some time depending on binder properties. The time to crack will be recorded and gives an indication about the "thermo shock properties" of the resin coated substrate and the tendency of the mold or core for cracking (veining) to be expected.

Test Method 8: "Buderus Test"

500 g of resin coated substrate are dropped through a funnel on a preheated hot plate with a temperature of 220° C. After 3 minutes baking time, the plate will be rotated by 180° and kept in this position for 7 minutes. Some loose substrate particles will immediately fall down and the weight be determined ("loose substrate"), some substrate particles with the coating being partly cured will fall down with a delay ("peel back"), and some substrate particles with the coating being cured will stick to the hot plate ("cured substrate"). The ratio cured substrate/loose substrate is a measure for the reactivity of the resin coated substrate. The peel-back of the substrate should be as low as possible since a high peel-back will lead to technical problems when used in foundries but also to a reduced recyclability of the loose substrate. The results are expressed as % of the total amount of tested substrate.

Test Method 9: Loss on Ignition (LOI)

To determine the loss on ignition (LOI) a sample (W1) of a coated substrate is weighed in a pre-weighed crucible (Wc) and tempered at 900° C. for 3 hours. After cooling to room temperature in a desiccator the crucible is weighed again (W2) and the weight of the remainders (W3) is calculated by subtracting the crucible weight according to the following formula: $W3 = W2 - Wc$. The LOI in [wt.-%] is calculated by the following formula: $LOI = ((W1-W3)/W1) \times 100$ IV Application Test Results

TABLE 4

Transverse strength, tested hot and cold (different substrates coated with any of resins 1a and 1b by coating method 1a)

| | Hot transverse strength [N/cm²] (test method 1) | | Cold transverse strength [N/cm²] (test method 2) | |
|---|---|---|---|---|
| Substrate | Resin 1a (0 wt.-% TEOS) | Resin 1b (2.4 wt.-% TEOS) | Resin 1a (0 wt.-% TEOS) | Resin 1b (2.4 wt.-% TEOS) |
| H33 (table 2, no. 1) | 250 | 265 | 600 | 740 |
| Reclaim V (table 2, no. 3) | 300 | 330 | 790 | 885 |
| Cerabeads (table 2, no. 4) | 235 | 310 | 700 | 815 |

TABLE 5

Thermoshock test (different substrates coated with any of resins 1a and 1b by coating method 1a)

| | "Thermoshock test" (Time to crack), [s] (test method 7) | |
|---|---|---|
| Substrate | Resin 1a (0 wt.-% TEOS) | Resin 1b (2.4 wt.-% TEOS) |
| H33 (table 2, no. 1) | 122 | 152 |
| Reclaim V (table 2, no. 3) | 143 | 147 |
| Cerabeads (table 2, no. 4) | 300 | 300 |

TABLE 6

Buderus test (different substrates coated with any of resins 1a and 1b by coating method 1a)

| | Cured substrate [g] (test method 8) | | Peelback [g] (test method 8) | | Loose substrate [g] (test method 8) | |
|---|---|---|---|---|---|---|
| Substrate | Resin 1a (0 wt.-% TEOS) | Resin 1b (2.4 wt.-% TEOS) | Resin 1a (0 wt.-% TEOS) | Resin 1b (2.4 wt.-% TEOS) | Resin 1a (0 wt.-% TEOS) | Resin 1b (2.4 wt.-% TEOS) |
| H33 (table 2, no. 1) | 345 | 318 | 3 | 5 | 152 | 177 |
| Reclaim V (table 2, no. 3) | 323 | 306 | 0 | 1 | 177 | 193 |
| Cerabeads (table 2, no. 4) | 303 | 294 | 2 | 3 | 195 | 203 |

TABLE 7

Stick point test (different substrates coated with any of resins 1a and 1b by coating method 1a)

| | Stick point of the coated substrate [° C.] (test method 6) | |
|---|---|---|
| Substrate | Resin 1a (0 wt.-% TEOS) | Resin 1b (2.4 wt.-% TEOS) |
| H33 (table 2, no. 1) | 85 | 87 |
| Reclaim V (table 2, no. 3) | 86 | 87 |
| Cerabeads (table 2, no. 4) | 87 | 89 |

TABLE 8

Hot tensile strength (substrate 5 of table 2 coated with different amounts of any of resins 2, 2a, 2b, 2c* by coating method 2)

| | Hot tensile strength [N/cm²] (test method 3) | | | |
|---|---|---|---|---|
| Amount of resin [g] on 100 g sand (Nugent 480) | Resin 2 (0 wt.-% TEOS) | Resin 2a (0.99 wt.-% TEOS) | Resin 2b (2.44 wt.-% TEOS) | Resin 2c (4.76 wt.-% TEOS) |
| 1.4 | 164 | 192 | 217 | 200 |
| 1.2 | 162 | 182 | 197 | 179 |
| 1.0 | 127 | 142 | 152 | 149 |
| 0.8 | 103 | 109 | 123 | 109 |

*Resin 2d could not be tested since it gelled during production.

TABLE 9

Cold transverse strength (substrate 5 of table 2 coated with different amounts of any of resins 2, 2a, 2b, 2c* by coating method 2)

| | Cold Transverse strength [N/cm²], (test method 4) | | | |
|---|---|---|---|---|
| Amount of resin [g] on 100 g sand (Nugent 480) | Resin 2 (0 wt.-% TEOS) | Resin 2a (0.99 wt % TEOS) | Resin 2b (2.44 wt.-% TEOS) | Resin 2c (4.76 wt.-% TEOS) |
| 1.4 | 17.3 | 21.6 | 22.5 | 20.2 |
| 1.2 | 14.4 | 18.0 | 18.8 | 18.4 |
| 1.0 | 11.1 | 12.3 | 16.2 | 14.8 |
| 0.8 | 8.0 | 10.9 | 12.0 | 11.6 |

*Resin 2d could not be tested since it gelled during production.

TABLE 10

Stick point (substrate 5 of table 2 coated with different amounts of any of resins 2, 2a, 2b, 2c* by coating method 2)

| | Stick point of the coated substrate [° C.] (test method 6) | | | |
|---|---|---|---|---|
| Amount of resin [g] on 100 g sand (Nugent 480) | Resin 2 (0 wt.-% TEOS) | Resin 2a (0.99 wt-% TEOS) | Resin 2b (2.44 wt.-% TEOS) | Resin 2c (4.76 wt.-% TEOS) |
| 1.4 | 93 | 93 | 92 | 91 |
| 1.2 | 93 | 95 | 92 | 92 |
| 1.0 | 94 | 95 | 93 | 95 |
| 0.8 | 96 | 96 | 95 | 95 |

*Resin 2d could not be tested since it gelled during production.

TABLE 11

Comparison of different parameters of hot coated sand (substrate 2 of table 2 coated with any of resins 2, 2b by coating method 4)

| Test | Test Method | Resin 2 (0 wt.-% TEOS) | Resin 2b (2.44 wt.-% TEOS) |
|---|---|---|---|
| Hot tensile strength [N/cm²] | 3 | 220 | 231 |
| Cold transverse strength [N/cm²] | 2 | 885 | 1545 |
| Stick point sand [° C.] | 6 | 94 | 95 |
| Loose sand [%] | 8 | 37.24 | 39.48 |
| Peel back [%] | 8 | 3.44 | 5.58 |
| Cured sand [%] | 8 | 59.32 | 54.94 |

TABLE 12

Comparison of different parameters of hot coated sand (substrate 1 of table 2 coated with any of resins 4a, 4b by coating method 1b)

| Test | Method | Resin 4a (0 wt.-% TEOS) | Resin 4b (2.8 wt.-% TEOS) |
|---|---|---|---|
| Hot transverse strength [N/cm²] | 1 | 285 | 355 |
| Cold transverse strength [N/cm²] | 2 | 850 | 975 |
| Peel back [%] of total sand | 8 | 12 | 4 |
| Stick point sand [° C.] | 6 | 89 | 88 |

TABLE 13

Comparison of different parameters of warm coated sand (substrate 6 of table 2 coated with any of resin solutions 3a, 3b by coating method 3)

| Test | Method | Resin 3a (0 wt.-% TEOS) | Resin 3b (2.4 wt.-% TEOS b.o.s.r.)* |
|---|---|---|---|
| Hot tensile strength 230° C. [N/cm²] | 3 | 324 | 386 |
| Cold tensile strength [N/cm2] | 5 | 510 | 620 |
| Peel back [%] of total sand | 8 | 14.5 | 14.5 |
| Stick point sand [° C.] | 6 | 99 | 101 |
| LOI @ 900° C., 3 h [%] | 9 | 4.2 | 4.2 |
| Foundry trials with nodular iron; casting temperature: 1380° C. | | | Less sticking, less veining, Improved casting surface |

*b.o.s.r. = based on solid resin including salicylic acid and TEOS

TABLE 14

Effect of the molar ratio (MR) hydroxybenzene/formaldehyde on several parameters of resin coated sands (substrate 1 of table 2, coating method 1a) coated with any of modified (2.4 wt.-% TEOS) phenol/formaldehyde novolaks 5a, 5b, 5c

| Test | Test Method | Resin 5a (MR = 1/0.6) | Resin 5b (MR = 1/0.7) | Resin 5c (MR = 1/0.8) |
|---|---|---|---|---|
| Hot transverse strength [N/cm²] | 1 | 245 | 275 | 250 |
| Cold transverse strength [N/cm²] | 2 | 845 | 810 | 630 |
| Stick point sand [° C.] | 6 | 80 | 86 | 92 |
| Loose sand [%] | 8 | 41.4 | 42.2 | 48.8 |
| Peel back [%] | 8 | 11.4 | 3.4 | 6.2 |
| Cured sand [%] | 8 | 47.2 | 54.4 | 45.0 |

V Conclusions from the Test Results

Effect of tetraethyl orthosilicate modification on the performance of an oxalic acid catalyzed phenol/formaldehyde novolak on different substrates (Tables 4-7):

An oxalic acid catalyzed phenol/formaldehyde novolak (resin 1) is modified by including 2.4 wt.-% TEOS (resin 1b). Three different substrates (substrates no 1, 3 and 4 of table 2) are hot-coated with either unmodified resin 1a or modified resin 1b, respectively. The modification of the resin by addition of TEOS resulted in an increase of the hot transverse strength (table 4) of test specimens in the range from 6 to 32% (depending on the substrate) and of the cold transverse strength (table 4) of test specimens in the range from 12 to 23% (depending on the substrate).

The largest increase of the hot tensile strength is obtained with test specimens made from an artificial substrate (Cerabeads 650 from Itochu, Japan, substrate no. 4 in table 2) coated with resin 1b. The largest increase of the cold transverse strength is obtained with test specimens made from new quartz sand (H33 from Quarzwerke Haltern, substrate no. 1 of table 2) coated with resin 1b.

A strong improvement in time to crack (+24%) measured by the thermoshock test (method 7, table 5) is found for test specimens made from new silica sand type H33 coated with resin 1b.

The "Buderus test" (method 8, table 6) shows a slight reduction (3 to 8%) in cure speed of substrates coated with resin 1b, compared to substrates coated with resin 1a.

Substrates coated with resin 1b show an increase in the stick point temperature of 1 to 2 K compared to substrates that were coated with an unmodified resin 1a (table 7).

Effect of the Quantity of Tetraethyl Orthosilicate Modification on a Sulfuric Acid Catalyzed Phenol/Formaldehyde Novolak (Tables 8-12):

A sulfuric acid catalyzed phenol/formaldehyde novolak (resin 2) is modified with 0.99 wt.-% (resin 2a), 2.44 wt.-% (resin 2b), and 4.76 wt.-% (resin 2c, not according to the invention) tetraethyl orthosilicate, respectively. Modification by addition of 9.09 wt.-% tetraethyl orthosilicate (resin 2d, not according to the invention) has been tried but failed since this product had gelled. A new Nugent 480 silica sand (substrate no 5 of table 2) is hot coated with different amounts of resin (1.4 g, 1.2 g, 1.0 g and 0.8 g resin/100 g sand) of either the unmodified resin 2 ore one of the three above described modified resins 2a, 2b, 2c.

The test specimens obtained from sand coated with a resin having 2.44 wt.-% tetraethyl orthosilicate added (resin 2b) perform best and yield the highest hot tensile strength (table 8) and cold transverse strength (table 9) results. The performance increase compared to test specimens obtained from sand coated with the unmodified resin 2 is in the range of from 19 to 32% in hot tensile strength and from 28 to 44% in cold transverse strength (in each case depending amounts of resin per 100 g of sand). A further increase in TEOS addition actually lowered the strength results of test specimens and is therefore not desirable.

When resin 2 is replaced by the modified resin 2b, the amount of resin per 100 g sand can be reduced from 1.4 wt.-% (resin 2) to an extrapolated amount of 1.12 wt.-% resin (equivalent to a reduction of the amount of resin of about 20%) at the same level of hot tensile strength, and to an extrapolated amount of 1.09 wt.-% resin (equivalent to a reduction of the amount of resin of about 22 wt.-%) at the same level of cold tensile strength.

Further analysis of the data and extrapolation suggests that modification of a sulfuric acid catalyzed phenol/formaldehyde novolak with 2.44 wt.-% tetraethyl orthosilicate allows for a reduction of the amount of resin per 100 g sand by approximately 20% while maintaining the same strength level of test specimens.

The melt point (table 10) of the discussed resin coated sand (2b versus 2) is reduced by 1° C. which is not significant.

When a Bauxite sand (substrate no. 2 of table 2) is coated with a modified resin 2b an increase in cold transverse strength of 74% is observed (table 11).

In another experiment (table 12) a plasticized, sulfuric acid catalyzed phenol/formaldehyde novolak (resin 4a) that is commercially available at Huettenes-Albertus Chemische Werke GmbH is modified by reaction with tetraethyl orthosilicate (resin 4b).

Test specimens obtained from sand (substrate no 1 of table 2) coated with the modified resin 4b show a hot transverse strength that is increased by 24% and a cold transverse strength that is increased by 15%, each compared to test specimens obtained from sand coated with the unmodified resin 4a. The observed peel back of the coated sand (test method 8) is reduced by 75%.

Effect of Tetraethyl Orthosilicate Modification on the Performance of a Resin Solution Used in the Warm Coating Process (Table 13):

An oxalic acid catalyzed novolak solution (resin solution 3a) for the warm coating process is modified (resin solution 3b) by addition of 2.4 wt.-% tetraethyl orthosilicate (calculated on the basis of dry resin, salicylic acid and TEOS and excluding the solvents methanol and water and a new quartz sand (AQ 90-500 from Sibelco, substrate no. 6 in table 2) is coated with the unmodified (resin solution 3a) as well as with the modified product (resin solution 3b) under warm coating conditions (coating method 3).

Test specimens obtained from sand coated with the modified resin 3b show a hot tensile strength that is increased by 19% and a cold tensile strength that is increased by 21%, each compared to test specimens obtained from sand coated with the unmodified resin 3a. The peel back value is not affected. The stick point of the sand is increased by 2° C. (not significant).

Effect of the Molar Ratio Hydroxybenzene/Formaldehyde on the Traverse Strength and the Buderus Test, Table 14):

For an oxalic acid catalyzed phenol/formaldehyde novolak, at a molar ratio in the range of from 1/0.6 (resin 5a) to 1/0.8 (resin 5c), more specifically at a ratio of 1/0.7 (resins 5b), the highest hot transverse strength of test specimens obtained from substrate 1 coated by coating method 1a, as well the highest weight of cured sand and the lowest peel back value are obtained.

The invention claimed is:

1. Resin prepared by an acid-catalyzed reaction of a phenol/formaldehyde novolak with tetraethyl orthosilicate in a mass ratio range from 1000:1 to 28:1, wherein the phenol of the phenol/formaldehyde novolak is substituted or unsubstituted hydroxybenzene or a mixture of two or more such phenols, wherein the phenol/formaldehyde novolak has a molar ratio of phenol to formaldehyde in the range of from 1:0.5 to 1:0.95.

2. Resin according to claim 1, wherein the mass ratio in which a phenol/formaldehyde novolak and tetraethyl orthosilicate are reacted is so adjusted that the strength of a molded article obtained from a particulate material coated with said resin is increased in comparison to a molded article obtained from a particulate material coated with a phenol/formaldehyde novolak which is not reacted with tetraethyl orthosilicate, but is otherwise identical.

3. Resin according to claim 1, wherein said resin is not part of a mixture comprising sand.

4. Resin according to claim 1 wherein said resin is not cured.

5. Resin according to claim 1, wherein the phenol is unsubstituted hydroxybenzene or a mixture of unsubstituted hydroxybenzene with one or more other phenols.

6. Resin according to claim 1, wherein the resin is prepared by the acid-catalyzed reaction of a phenol/formaldehyde novolak with tetraethyl orthosilicate in a mass ratio in the range of from less than 100:1 to 28:1.

7. Resin according to claim 1, wherein the phenol/formaldehyde novolak has a molar ratio of phenol to formaldehyde in the range of from 1:0.55 to 1:0.9.

8. Resin-coated particulate material or mixture of particulate material with a resin, the particulate material or mixture comprising inorganic particles coated by or mixed with, respectively, a resin according to claim 1.

9. Resin-coated particulate material or mixture according to claim 8, wherein the resin is curable by crosslinking, or the particulate material or mixture is a cured resin-coated particulate material or mixture, respectively.

10. Resin-coated particulate material or mixture according to claim 9, wherein the crosslinking agent is
an aldehyde,
and/or
a resol,
and/or wherein the precursor releasing a crosslinking agent when heated is
a methylene donor component that generates formaldehyde when heated.

11. Resin coated particulate material or mixture according to claim 8, wherein the average particle diameter of the inorganic particles is >100 μm.

12. Resin preparation comprising
a resin according to claim 1
and one or more of the following constituents:
a crosslinking agent and/or a precursor releasing a crosslinking agent when heated, wherein the crosslinking agent is selected from the group consisting of formaldehydes and resols, and
a further resin.

13. Method of making a resin prepared by an acid-catalyzed reaction of a phenol/formaldehyde novolak with tetraethyl orthosilicate in a mass ratio range from 1000:1 to 28:1, wherein the phenol of the phenol/formaldehyde novolak is substituted or unsubstituted hydroxybenzene or a mixture of two or more such phenols, wherein the phenol/formaldehyde novolak has a molar ratio of phenol to formaldehyde in the range of from 1:0.5 to 1:0.95, the method comprising:
preparing or providing a phenol/formaldehyde novolak, wherein the phenol of the phenol/formaldehyde novolak is substituted or unsubstituted hydroxybenzene or a mixture of two or more such phenols,
reacting the phenol/formaldehyde novolak with tetraethyl orthosilicate in a mass ratio above 28:1,
optionally distilling the product of the reaction of the phenol/formaldehyde novolak with tetraethyl orthosilicate to at least partially remove the ethanol formed during said reaction.

14. Method of making a resin-coated particulate material or mixture of particulate material with a resin, the method comprising:
providing or making a resin prepared by an acid-catalyzed reaction of a phenol/formaldehyde novolak with tetraethyl orthosilicate in a mass ratio range from 1000:1 to 28:1, wherein the phenol of the phenol/formaldehyde novolak is substituted or unsubstituted hydroxybenzene or a mixture of two or more such phenols, wherein the phenol/formaldehyde novolak has a molar ratio of phenol to formaldehyde in the range of from 1:0.5 to 1:0.95,
providing inorganic particles, and
coating said inorganic particles with said resin.

15. Shell mold or shell core prepared by the shell molding process using
a resin according to claim 1 or
a resin-coated particulate material or mixture comprising a resin according to claim 1 or
a resin preparation comprising a resin according to claim 1 and a crosslinking agent and/or a precursor releasing a crosslinking agent when heated.

16. Process of coating and/or binding a particulate material, wherein said particulate material is coated and/or bonded with a resin prepared by an acid-catalyzed reaction of a phenol/formaldehyde novolak with tetraethyl orthosilicate in a mass ratio from 1000:1 to 28:1, wherein the phenol of the phenol/formaldehyde novolak is substituted or unsubstituted hydroxybenzene or a mixture of two or more such phenols, wherein the phenol/formaldehyde novolak has a molar ratio of phenol to formaldehyde in the range of from 1:0.5 to 1:0.95.

17. Process according to claim 16, wherein the phenol is unsubstituted hydroxybenzene or a mixture of unsubstituted hydroxybenzene with one or more other phenols.

18. Process according to claim 16, wherein the coating and/or bonding step further comprises a crosslinking agent and/or a precursor releasing a crosslinking agent when heated.

19. Process according to claim 18, wherein the crosslinking agent is
an aldehyde,
and/or
a resol,
and/or wherein
the precursor releasing a crosslinking agent when heated is
a methylene donor component that generates formaldehyde when heated.

20. Process
for the production of resin coated particles; or
for the production of shell molds and shell cores in the shell molding process; or
of making proppants for use in the hydraulic fracturing process; or
of making a resin bonded abrasive grinding, snagging or cut-off wheel, comprising the process according to claim 16.

21. Shell molding process for the production of a shell mold or a shell core, comprising:
preparing or providing a resin-coated particulate material or mixture of particulate material with a resin, the particulate material or mixture comprising inorganic particles coated by or mixed with, respectively, a resin prepared by an acid-catalyzed reaction of a phenol/formaldehyde novolak with tetraethyl orthosilicate in a mass ratio range from 1000:1 to 28:1, wherein the phenol of the phenol/formaldehyde novolak is substituted or unsubstituted hydroxybenzene or a mixture of two or more such phenols, wherein the phenol/formaldehyde novolak has a molar ratio of phenol to formaldehyde in the range of from 1:0.5 to 1:0.95;
producing a shell mold or a shell core comprising said resin-coated particulate material.

22. Hydraulic fracturing process, comprising:
forming a fracture in a reservoir rock formation
injecting a fluid into the fracture
introducing a proppant into the injected fluid, said proppant comprising a resin-coated particulate material or mixture of particulate material with a resin, the particulate material or mixture comprising inorganic particles coated by or mixed with, respectively, the resin prepared by an acid-catalyzed reaction of a phenol/formaldehyde novolak with tetraethyl orthosilicate in a mass ratio range from 1000:1 to 28:1, wherein the phenol of the phenol/formaldehyde novolak is substituted or unsubstituted hydroxybenzene or a mixture of two or more such phenols, wherein the phenol/formaldehyde novolak has a molar ratio of phenol to formaldehyde in the range of from 1:0.5 to 1:0.95.

23. Process of making a resin bonded abrasive grinding, snagging or cut-off wheel, comprising:
- preparing or providing a resin-coated particulate material or mixture of particulate material with a resin, the particulate material or mixture comprising inorganic particles coated by or mixed with, respectively, the resin prepared by an acid-catalyzed reaction of a phenol/formaldehyde novolak with tetraethyl orthosilicate in a mass ratio range from 1000:1 to 28:1, wherein the phenol of the phenol/formaldehyde novolak is substituted or unsubstituted hydroxybenzene or a mixture of two or more such phenols, wherein the phenol/formaldehyde novolak has a molar ratio of phenol to formaldehyde in the range of from 1:0.5 to 1:0.95, wherein the inorganic particles comprise abrasive grains
- pressing the material to form a wheel
- curing the resin.

24. Resin according to claim 1, wherein the resin is prepared by an acid-catalyzed reaction of a phenol/formaldehyde novolak with tetraethyl orthosilicate and a crosslinking agent.

25. Resin according to claim 1, wherein the acid-catalyzed reaction of a phenol/formaldehyde novolak with tetraethyl orthosilicate is in a mass ratio range from 50:1 to 28:1.

26. The process according to claim 16, wherein the process comprises:
- producing resin coated particles; or
- producing shell molds and shell cores; or
- making proppants in a hydraulic fracturing process; or
- making a resin bonded abrasive grinding, snagging or cut-off wheel.

* * * * *